R. D. RALSTON.
BRAKE.
APPLICATION FILED AUG. 31, 1911.
1,070,179.
Patented Aug. 12, 1913.
2 SHEETS—SHEET 2.
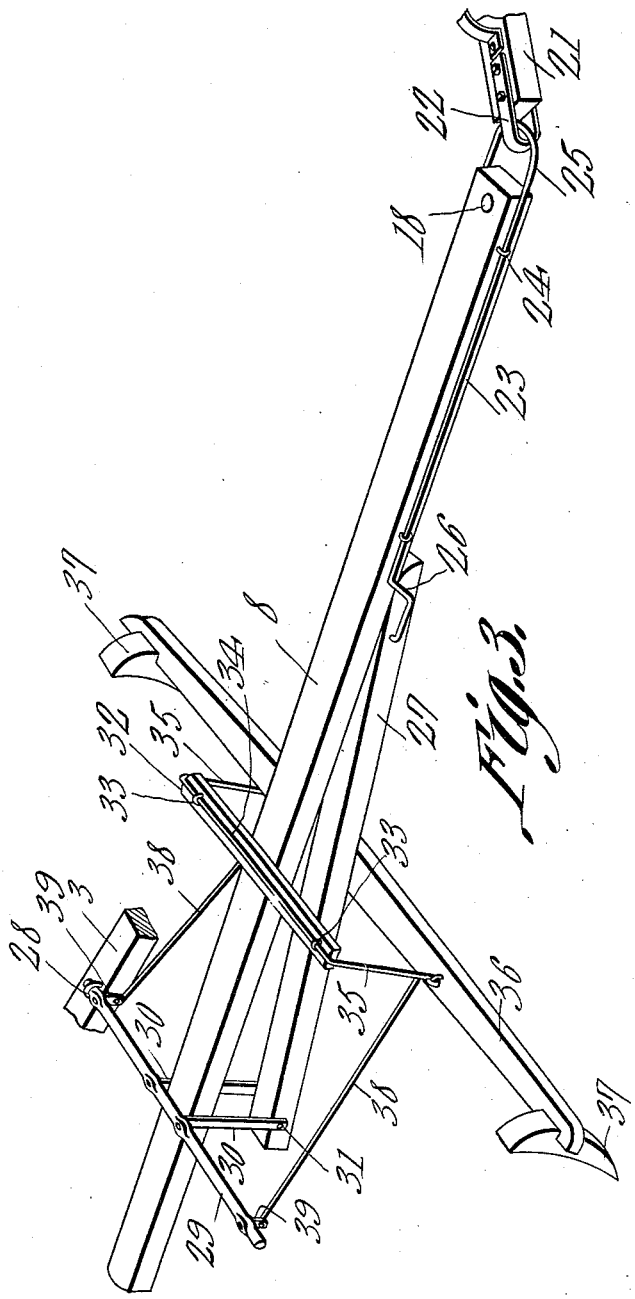
R. D. Ralston,
Inventor
by C. A. Snow & Co.,
Attorneys

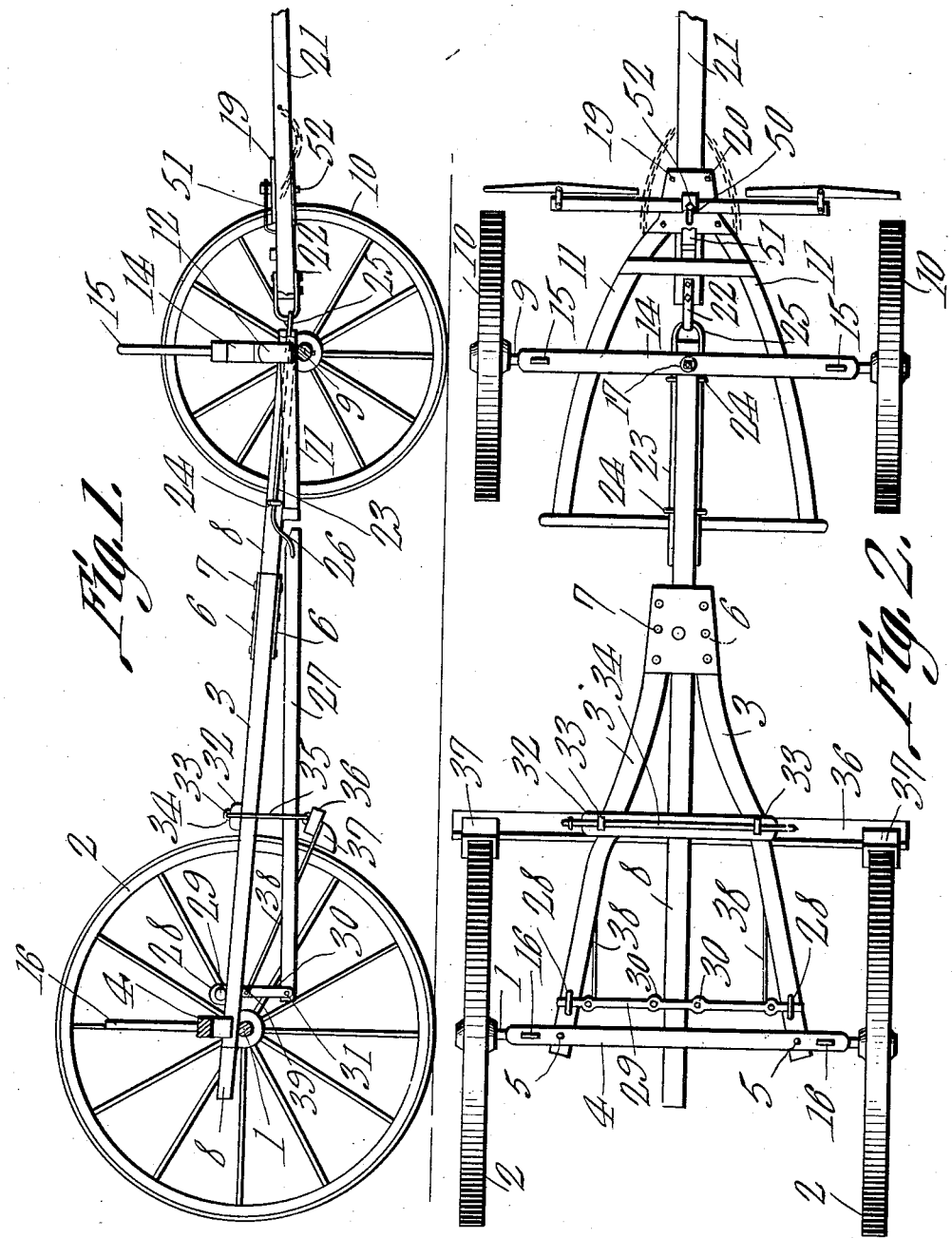

UNITED STATES PATENT OFFICE.

ROBERT D. RALSTON, OF WILSCOT, GEORGIA.

BRAKE.

1,070,179.  Specification of Letters Patent.  Patented Aug. 12, 1913.

Application filed August 31, 1911. Serial No. 647,106.

*To all whom it may concern:*

Be it known that I, ROBERT D. RALSTON, a citizen of the United States, residing at Wilscot, in the county of Fannin and State of Georgia, have invented a new and useful Brake, of which the following is a specification.

It is the object of the present invention to provide a brake mechanism which may be assembled with a vehicle of ordinary construction, the structure being so devised that when vehicle is moving down-hill, the brakes will be set, thereby preventing the vehicle from being thrust against the draft animals.

A further object of the invention is to provide a novel means for applying the brake mechanism, under the circumstances above set forth, and to provide novel means whereby the brake mechanism may be operatively connected with the tongue of the vehicle.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the accompanying drawings,—Figure 1 shows the invention in vertical longitudinal section, parts being shown in elevation; Fig. 2 is a top plan; and Fig. 3 is a perspective of the brake mechanism proper.

In the accompanying drawings, the rear axle is denoted generally by the numeral 1, the rear axle 1 carrying the rear wheels 2. The rear hounds are denoted by the numeral 3, and rest upon the rear axle 1, the rear hounds 3 supporting a rear bolster 4, the rear hounds and the rear bolster being secured to the rear axle 1, as is common, the securing means being denoted generally, at 5. The forward ends of the rear hound members are connected by upper and lower plates 6, secured together by means of bolts 7 or the like.

The reach is denoted generally by the numeral 8, the reach being located between the rear bolster 4 and the rear axle 1, the reach extending forwardly, between the plates 6.

The forward axle is denoted generally by the numeral 9, the axle 9 carrying the forward wheels 10. The forward hounds are denoted by the numerals 11, the forward bolster being denoted by the numeral 12, and being superposed upon the forward hounds. Located upon the forward bolster 12, is a transverse support 14, having upstanding stakes 15, adapted to coöperate with stakes 16 upon the rear bolster 4, in engaging a wagon box (not shown). The king pin or pivot element 17 is extended through the support 14, through the forward bolster 12, through an opening 18 in the reach 8, into engagement with the forward axle 9. The support 14, of course, moves pivotally upon the element 17, and the element 17 serves as a pivotal mounting for the forward end of the reach 8.

The forward ends of the forward hound members are connected by plates 19, held in place upon the upper and lower faces of the hounds, by means of securing elements 20. Slidably mounted between the plates 19, and between the forward ends of the hound members, is the tongue 21, the same being provided at its rear end with a clevis 22. An arched connection 23 extends along the sides of the reach 8, and is slidably mounted in guides 24, carried by the sides of the reach. The bend 25 of the arched connection 23, extends across the forward end of the reach 8, in front of the forward axle 9, this bend 25 of the arched connection 23 being pivotally interengaged with the clevis 22 which is carried by the rear end of the tongue 21. Adjacent its rear end, the arched connection 23 is downwardly curved, as shown at 26, to dispose its rear ends below the reach 8. The rear ends of the arched connection 23 are attached to the rearwardly extended actuating bar 27, extended downwardly and rearwardly, to a point adjacent, but in front of, the rear axle 1.

Adjacent the rear bolster 4, the rear hounds 3 carry bearings 28, in which is journaled for rotation, a shaft 29. The shaft 29 is equipped, adjacent its middle portion, with depending primary arms 30, located upon opposite sides of the reach 8, the arms 30 coöperating with the reach 8, to prevent longitudinal movement of the shaft 29, whereby the ends of the shaft 29 are maintained, rotatably, at all times, in the bearings 28. Pivotally connected, as shown at 31, with the lower ends of the arms 30, is the actuating bar 27, hereinbefore described.

Secured transversely to the rear hounds 3, is a supporting bar 32, provided with bearings 33, in which is journaled a hanger shaft 34, having depending ends 35, located well beyond the rear hounds 3. The lower extremities of the ends 35 are pivotally connected with a brake beam 36, having brake shoes 37, adapted to engage with the rear wheels 2. The brake beam 36 is connected, by means of a pair of rearwardly extended links 38, with secondary arms 39, depending from the shaft 29, in the vicinity of the rear hounds 3, the connection between the links 38 and the arms 39 being a pivotal one.

The plates 19 are longitudinally slotted, as shown at 50. Secured to the rear end of the tongue 21, is a bracket 51, overhanging the uppermost plate. The pin 52, carrying the draft tree, is inserted through the forward end of the bracket 51 and through the tongue 21, the pin 52 moving in the slots 50, and permitting the tongue 21 to have the necessary movement during the setting and releasing of the brakes, independently of the tree.

The operation of the device is as follows: When the vehicle is moving down-hill, the arched connection 23 will be slid rearwardly, through the rearward thrust of the longitudinally slidable tongue 21, this rearward movement of the connection 23 serving to move the actuating bar rearwardly, the rearward movement of the bar 27 serving to swing the lower ends of the arms 30 rearwardly, the shaft 29 being thus rotated forwardly, and the secondary arms 39 being swung rearwardly, at their lower, free ends, whereupon the links 38 will be drawn rearwardly, the brake beam 36 and the brake shoes 37 moving rearwardly, likewise, into engagement with the rear wheels 2. It will thus be seen that when the vehicle moves down-hill, the brakes will be automatically applied to the rear wheels, thereby preventing the vehicle from crowding forwardly, upon the draft animals.

Having thus described the invention, what is claimed is:—

The combination with the rear hounds and the reach of a vehicle, of a U-shaped member, guides secured to the sides of said reach and slidably engaging and supporting said U-shaped member, a sliding tongue pivotally engaging said U-shaped member at the bend thereof, the rear ends of said U-shaped member being bent downward below the vehicle reach and then inward to form pivoting arms, a brake beam, supporting arms therefor, a shaft rotatably supported by the rear vehicle hounds, said rotatable shaft provided with arms secured thereto and depending therefrom and linkedly connected to the said brake beam, a second set of arms secured to and depending from said rotatable shaft embracing the vehicle reach, a bar pivotally secured to said last mentioned arms, positioned above the brake beam and secured against accidental displacement thereby, the forward end of said bar pivotally secured to the pivoting arms of said U-shaped member and held in sliding contact with the under surface of the vehicle reach.

In testimony that I claim the foregoing as my own, I have hereto affixed my signature in the presence of two witnesses.

ROBERT D. RALSTON.

Witnesses:
 FRANK B. OCHSENREITER,
 RUTH SCOTT.